United States Patent [19]

Hermann, deceased et al.

[11] 3,839,208

[45] Oct. 1, 1974

[54] ANTI-FRICTION BEARING LINING COMPOSITION

[75] Inventors: Georges Hermann, deceased, late of Annecy, France by Marie Therese Atalaphe; Jean Christophe Dominique Hermann, Annecy, France; Beatrice Jeannette Hermann, Annecy, France; Frederic Claude Joseph Hermann, Annecy, France; Claude Alfred Georges Hermann; Brigitte Marguerite Aimee Hermann, Annecy, France heirs

[73] Assignee: Societe Industrielle des Coussinets, Paris, France

[22] Filed: Jan. 3, 1972

[21] Appl. No.: 215,143

Related U.S. Application Data

[63] Continuation-in-part of Ser. No. 788,088, Dec. 30, 1968, abandoned.

[30] Foreign Application Priority Data

Dec. 27, 1967 France .......................... 67.133839

[52] U.S. Cl. .............................................. 252/12
[51] Int. Cl. ............................................ C10m 7/32
[58] Field of Search ........... 252/12, 12.2, 12.4, 12.6

[56] References Cited
UNITED STATES PATENTS

| | | |
|---|---|---|
| 2,528,934 | 11/1950 | Wiles ..................................... 252/12 |
| 2,773,048 | 12/1956 | Formo et al. ......................... 252/12 |
| 2,892,849 | 6/1959 | St. Clair ................................ 252/12 |
| 2,956,848 | 10/1960 | St. Clair ................................ 252/12 |
| 3,037,893 | 6/1962 | White ................................... 252/12 |
| 3,079,338 | 2/1963 | Caubet .................................. 252/12 |
| 3,346,490 | 10/1967 | Eschen .................................. 252/12 |
| 3,361,666 | 1/1968 | Gaddis et al. ........................ 252/12 |
| 3,380,843 | 4/1968 | Davis .................................... 252/12 |

Primary Examiner—Daniel E. Wyman
Assistant Examiner—I. Vaughn
Attorney, Agent, or Firm—Pennie & Edmonds

[57] ABSTRACT

This invention relates to an anti-friction bearing lining composition which comprises the product resulting from heating at a sufficient temperature and for a sufficient period of time to cause curing a mixture of:
  a. at least one solid epoxy resin containing terminal epoxy groups and having a molecular weight in the range from about 2,000 to 4,000;
  b. a carboxylic acid anhydride in an amount from about 1 to 17 equivalents of anhydride per epoxy equivalent;
  c. an organic curing accelerator containing an active hydrogen atom or a tertiary amine group in an amount from about 0.1 to 0.5 phr (parts per 100 parts resin); and
  d. one or more inorganic anti-friction materials in an amount from about 4 to 20 percent by weight.

7 Claims, No Drawings

ANTI-FRICTION BEARING LINING COMPOSITION

CROSS-REFERENCE TO RELATED APPLICATION

This is a continuation-in-part of my earlier filed application Ser. No. 788,088, filed Dec. 30, 1968 and now abandoned.

SUMMARY OF THE INVENTION

This invention is based on the discovery that a specific epoxy resinous composition can be prepared to provide unusual properties for use as liner for bearing under dynamic loads in lubricated operation such as for bearings used in combustion engines. Broadly stated, the bearing composition of this invention comprises the product resulting from heating at a sufficient temperature and for a sufficient period of time to cause curing a mixture of:

a. at least one solid epoxy resin containing terminal epoxy groups and having a molecular weight in the range from about 2,000 to 4,000;

b. a carboxylic acid anhydride in an amount from about 1 to 17 equivalents of anhydride per epoxy equivalent;

c. an organic curing accelerator containing an active hydrogen atom or a tertiary amine group in an amount from about 0.1 to 0.5 phr (parts per 100 parts resin); and d. one or more inorganic anti-friction materials in an amount from about 4 to 20 percent by weight.

Solid epoxy resins which do not have terminal epoxy groups may be used in combination with the expoxy resin with terminal epoxy groups as long as it is miscible with the solid epoxy resin at an elevated temperature and has a molecular weight not exceeding 50,000. A plasticizer may be incorporated in the resultant epoxy composition.

DESCRIPTION OF THE PREFERRED EMBODIMENTS

Many kinds of epoxy resins may be employed in the bearing compositions of this invention as long as they are solid epoxy resins containing terminal epoxy groups and have molecular weights in the range from about 2,000 to 4,000. Examples of epoxy resins possessing these characteristics and which are therefore suitable for use in the bearing compositions of this invention include the glycidyl polymers which are produced by reacting epichlorohydrin with a hydroxyl compound such as a polyol or phenol.

Glycidyl polymers which have been found to be useful include solid diglycidyl ethers of bisphenol A, the condensation products of epichlorohydrin with butanediol, glycerol, resorcinol and hydroquinone.

Minor amounts of numerous other types of epoxy resins which do not have terminal epoxy groups but possess intermediate epoxy groups, have a molecular weight not in excess of 50,000 and are miscible with the solid epoxy-terminated epoxy resins at the elevated temperature normally used for blending the resins may be employed in combination with the solid epoxy-terminated epoxy resins. Examples of epoxy resins not having terminal epoxy groups which have been found useful in this invention include the cyclic and acyclic aliphatic epoxy resins which can possess several intermediate epoxy groups per molecule. Typical resins of this type that are advantageously employed include the "Oxiron" resins (FMC Corp.), the epoxidized derivatives of glycerides of unsaturated fatty acids, and cyclic aliphatic products such as limonene dioxide, vinyl cyclohexene dioxide and dicyclopentadiene dioxide.

The carboxylic acid anhydrides of this invention may be solid or liquid. Suitable compounds include succinic, maleic, phthalic, tetrahydrophthalic, hexahydrophthalic and pyromellitic anhydrides. The anhydrides are employed in the proportion of from about 1 to 17 equivalents of anhydride per epoxy equivalent.

The curing accelerators may be selected from the compounds possessing an active hydrogen atom, such as bases, alcohols, phenols, primary and secondary amines, alone or mixed, or modified (for example, the product resulting from the addition of ethylene diamine and diglycidyl ether of bisphenol A, or of ethylene diamine and ethylene oxide), cyclic aliphatic amines and contingently modified primary aromatic amines and tertiary amines such as the benzyldimethylamines. The tertiary amines, however, are preferred. The accelerator is employed in the proportion of 0.1 to 0.5 phr.

The anti-friction materials should be used in a quantity sufficient to provide a reasonable compromise between the coefficient of friction and resiliency, and to avoid seizing whilst keeping the modulus of elasticity of the anti-friction composition as low as possible. Good results are obtained in this respect with an amount of anti-friction material, the equal to about 4 to 20 percent by weight of the composition. Examples of anti-friction materials whch have been found useful include anhydrous aluminum phosphate and alkali borophosphates having the general formula:

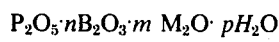

$$P_2O_5 \cdot nB_2O_3 \cdot m\ M_2O \cdot pH_2O$$

wherein $n$ and $m$ each is in the range between 1.5 and 2.5, $p$ is between 0.5 and 2 and M is an alkali metal. The preparation of the alkali borophosphates is disclosed in French Pat. No. 1,330,678. Numerous other inorganic anti-friction materials may advantageously be employed as well be readily apparent to one skilled in the art.

In the case in which the compositions are pulverulent, it is unnecessary to add a plasticizer. If they appear in the form of a putty as would be the case with a liquid carboxylic anhydride, a conventional plasticizer may be introduced such as dibutylphthalate. It is advantageous to employ particular polyols such as polyethylene glycol, etc. which insure internal plasticization.

Adjuvants may be incorporated into the composition of this invention. Examples of some useful adjuvants include polyvinyl formal or butyral in solution at 20 percent by weight in cyclohexanone employed in the proportion 0 to 15 percent by weight of the resins. The polyvinyl butyral advantageously employed has low viscosity and titers between 9 and 13 percent of polyvinyl alcohol. The lubricant advantageously is graphite employed in the proportion of 1 to 5 percent by weight related to the resins, or a semi-metallic element of group V of the periodic table of elements which is advantageously bismuth. Silicon compounds may be added to improve surface wetting. SIL-AID 11 supplied by the Societe Industrielle des Silicones, in the proportion of 1 to 5 phr has been found useful for this purpose.

The compositions are prepared by mixing the molten epoxy resin or resins to which is added the carboxylic acid anhydride and if desired, a plasticizer and an adjuvant, then the antifriction materials, and finally, the curing accelerator. According to the materials employed, either a paste or a solid mixture is thus obtained. If a paste is obtained, it can be fed into a homogenizer from which it issues homogenized and plasticized. The mixture is shaped, for example, by passing through an extrusion press to the form desired. If a solid mixture is obtained it can be homogenized, for example, by being passed through a ball mill. The compositions according to the invention are then applied on the metal underlayer to be coated according to any appropriate techniques.

The curing operation is performed in a slightly different manner depending on whether the composition is in the form of a putty or of a powder. In the case of the former, heating is applied progressively, up to about 150°C, to the base putty assembly, in order to eliminate the volatile substances and to provide adequate adhesion. A preliminary hardening action is made to occur between 150°C and approximately 165°C, for a duration which can vary from 5 to 10 minutes followed by the main curing operation at a temperature between about 165°C and approximately 220°C for half an hour to approximately 5 hours.

In case of the pulverulent solid mixture, the preliminary hardening of the base powder assembly is performed at once followed by the main curing operation.

The new anti-friction lining compositions of this invention are characterized by excellent adhesion to metal bases such as steel, mild steel, copper, copper alloys, aluminum and aluminum alloys. The coated stock may be rolled and drawn. The compositions according to this invention possess very satisfactory thermal and chemical stabilities and their resistance to wear, dimensional stability and incrustation capacity are equally excellent.

The following example is illustrative of the invention.

EXAMPLE

The following anti-friction composition was produced:

| Ingredient | Amount (by weight) |
|---|---|
| Endomethylenemethyltetrahydrophthalic anhydride, by weight | 41.6% |
| Epoxy resin (polycondensate of diphenylolpropane and epichlorohydrin), molecular weight 3000 | 41.90% |
| Polyethylene glycol, molecular weight 400 | 8.33% |
| Surface-active agent (silicone compound SIL-AID 11 of Societe Industrielles des Silicones) | 0.41% |
| Accelerator (benzyldimethylamine) | 0.28% |
| Anti-friction material neutral and anhydrous aluminum phosphate) | 6.94% |

The solid epoxy resin was dissolved in endomethylenemethyltetrahydrophthalic anhydride in a stainless steel vessel equipped with a stirrer of the same nature, by heating to 120°C. Polyethylene glycol was added to the resulting mixture while the mixture was being stirred constantly. The mixture was allowed to cool to ambient temperature, after which the surface-active agent and benxyldimethylamine were respectively introduced. After this addition, stirring of the mixture was continued until a homogenous product was obtained. The neutral aluminum phosphate was then added whilst stirring continued. The mixture was then fed into a multi-cylinder grinder to accomplish its physical plasticization.

The putty or paste issuing from this grinder was fed into a worm extruder maintained at 50°C which converted the paste into a cylinder of a diameter of 4 mms and a length of 500 mms. A portion of 5g of this cylinder was arranged in a duraluminum ring having the following composition:

| | |
|---|---|
| Cu | 4.28 |
| Mg | 0.92 |
| Mn | 0.70 |
| Si | 0.54 |
| Fe | 0.33 |
| Al | 93.23 |

After having been degreased, pickled with nitric acid, rinsed in water and dried, the ring had the following dimensions:

| | |
|---|---|
| length | 30 mms |
| external diameter | 55 mms |
| internal diameter | 45.6 mms |
| bore diameter | 45.08 mms |

After application under pressure of the cylinder of paste within the ring, a preliminary heating was carried out on the resin by raising the temperature of the ring from 20°C to 150°C over 8 minutes. The main curing operation was then performed for 7 minutes at 165°C, with a post-curing operation of 2 hours at 190°C.

A crankshaft was fitted into the ring and finally reamed to a diameter of 45.08 mms. A load of 1800 kgs. or 266 kgs per $cm^2$ of projected surface was applied on the ring during 90° of the rotation. The crankshaft was coupled to an electric motor running at 1500 r.p.m. After 170 hours of continuous operation, the internal lining of the ring did not display any wear, apparent cracking, or separation.

I claim:

1. An anti-friction bearing lining composition which comprises the product resulting from heating at a sufficient temperature and for a sufficient period of time to cause curing a mixture of:
   a. at least one solid epoxy resin containing terminal epoxy groups and having a molecular weight in the range from about 2,000 to 4,000;
   b. an anhydride of a polycarboxylic acid having 2 to 4 carboxyl groups in an amount from 1 to 17 equivalents of anhydride per epoxy equivalent;
   c. from about 0.1 to 0.5 phr based on the solid epoxy resin of an organic curing accelerator containing an active hydrogen atom selected from alcohols, phenols or amines, or a tertiary amine; and
   d. one or more inorganic anti-friction materials in an amount from about 4 to 20 percent by weight.

2. The anti-friction bearing lining composition of claim 1 wherein the solid epoxy resin is mixed with a minor amount of a second epoxy resin which does not contain terminal epoxy groups but contains intermediate epoxy groups, said second epoxy resin having a molecular weight not in excess of about 50,000 and being miscible with the first mentioned epoxy resin at the temperature employed for blending the resins.

3. The anti-friction bearing lining composition of claim 2 wherein the second epoxy resin is a cyclic or acyclic aliphatic epoxy resin.

4. The anti-friction bearing lining composition of claim 1 wherein the carboxylic acid anhydride is succinic, maleic, phthalic, tetrahydrophthalic, hexhydrophthalic or pyromellitic anhydride.

5. The anti-friction bearing lining composition of claim 1 wherein the inorganic anti-friction material is anhydrous aluminum phosphate, graphite, lead sulfide or an alkali borophosphate having the general formula

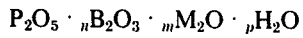

wherein $n$ and $m$ each is a number between 1.5 and 2.5, $p$ is a number between 0.5 and 2 and M is an alkali metal.

6. The anti-friction bearing lining composition of claim 1 wherein the solid epoxy resin is a glycidyl polymer resulting from the reaction of epichlorohydrin with a polyol or phenol.

7. The anti-friction bearing lining composition of claim 6 wherein the glycidyl polymer is a diglycidyl ether of bisphenol A.

* * * * *